United States Patent
Lafaye et al.

(10) Patent No.: US 6,193,435 B1
(45) Date of Patent: Feb. 27, 2001

(54) DEVICE FOR FIXING A BUILT-IN APPARATUS

(75) Inventors: Michel Lafaye, Soyaux; Gérard Pitault, Ruelle, both of (FR)

(73) Assignee: Schneider Electric SA, Boulogne Billancourt (FR)

( * ) Notice: Subject to any disclaimer, the term of this patent is extended or adjusted under 35 U.S.C. 154(b) by 0 days.

(21) Appl. No.: 09/355,995

(22) PCT Filed: Dec. 22, 1998

(86) PCT No.: PCT/FR98/02841

§ 371 Date: Aug. 24, 1999

§ 102(e) Date: Aug. 24, 1999

(87) PCT Pub. No.: WO99/34490

PCT Pub. Date: Jul. 8, 1999

(30) Foreign Application Priority Data

Dec. 24, 1997 (FR) .................................................. 97 16823

(51) Int. Cl.⁷ .............................. B25G 3/18; F16B 21/00; F16D 1/00
(52) U.S. Cl. .......................... 403/329; 403/325; 403/321; 403/408.1; 403/338; 403/373; 24/115 G; 24/459

(58) Field of Search ................................. 24/115 G, 459; 403/329, 325, 321, 322.1, 408.1, 409.1, 335, 338, 373

(56) References Cited

U.S. PATENT DOCUMENTS

| | | | | |
|---|---|---|---|---|
| 4,453,292 | * | 6/1984 | Bakker | 24/115 G |
| 4,831,694 | * | 5/1989 | Kong | 24/625 X |
| 4,945,849 | * | 8/1990 | Morris et al. | 24/115 G X |
| 5,361,461 | * | 11/1994 | Anscher | 24/115 G |
| 5,971,119 | * | 10/1999 | Chi | 24/625 X |

FOREIGN PATENT DOCUMENTS

2718798 * 10/1995 (FR).

* cited by examiner

Primary Examiner—Lynne H. Browne
Assistant Examiner—Ernesto Garcia
(74) Attorney, Agent, or Firm—Oblon, Spivak, McClelland, Maier & Neustadt, P.C.

(57) ABSTRACT

A device for fixing a built in apparatus in a panel opening. Bolts, each having a base, fixed to the apparatus and a sliding piston are urged into contact with the panel by the action of compression springs. The piston includes push clips emerging into slots of the base to catch the piston on the base in an inoperative position and for triggering the locking by releasing the piston.

10 Claims, 2 Drawing Sheets

DEVICE FOR FIXING A BUILT-IN APPARATUS

BACKGROUND OF THE INVENTION

1. Field of the Invention

This invention relates to an attachment device for a fitting designed to be flush mounted in a panel opening, using locks each consisting of a base that fits onto the fitting, and a sliding piston that comes into contact with the panel under the action of compression springs.

It is applicable particularly to flush mounting of a housing for an electric or electronic fitting (for example for a control and/or display device) in a panel window such that only the back face of the housing will be visible from the outside.

2. Discussion of the Background

The housing body, the cross-section of which is approximately the same as the cross-section of the window into which it fits, usually comprises a peripheral rim that acts as a stop at the housing limit stop, and secondly a joint cover that conceals the junction between the housing and the panel.

Many solutions have been proposed to lock the housing onto the panel when the housing is in the flush mounted position. Document FR 2 718 198 describes a locking device that makes use of elastic locks consisting of an attachment base plate and a sliding pusher acted upon by elastic means bearing on the attachment sole plate. The attachment sole plate is fitted onto the side walls of the fitting housing, whereas the thruster pushes on the back of the panel.

SUMMARY OF THE INVENTION

The purpose of the invention is to suggest locks which can be easily locked simply by pressing with fingers, without the need for any special tools. These locks can be adapted to suit different flush mounting panel thicknesses.

The locking device according to the invention is characterized by the fact that the piston comprises click fit pushers that engage into slots in the base, so that the piston fastens onto the base in the rest position, and releases the piston when the lock is released.

BRIEF DESCRIPTION OF THE DRAWINGS

The invention will now be described with reference to an embodiment of the invention given as a nonrestrictive example with reference to the attached drawings in which.

DETAILED DESCRIPTION OF THE PREFERRED EMBODIMENTS

Figure 1:
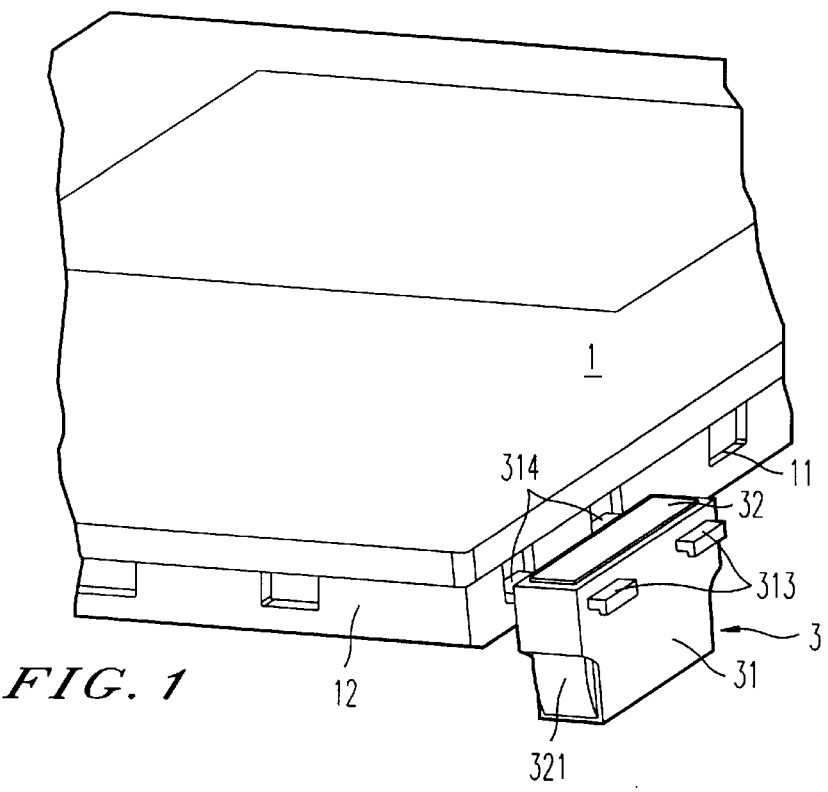
FIG. 1 is a perspective view showing the flush mounting type fitting and one of the attachment locks.

The device according to the invention attaches a flush mounting type electric or electronic fitting 1 in a window in a panel 2 by means of attachment locks 3. For example, this fitting could be a terminal and control and display components (not shown) could be provided on the front panel.

Each elastic lock 3 consists of a base 31 attached to the fitting, a sliding piston 32 that comes into contact with the panel and compression springs 33 and 34 fitted between these two parts.

The base 31 in the form of a shell is used as a housing for piston 32. In its central part, it comprises a non-through reaming forms a housing 317 that guides the piston 32 and it has two slots 312 and 313 cutout on its sides. The base comprises two first hooks 313 on one side, and two second hooks 314 on the other side, close to the contact surface of the pusher 321 or 322, these first and second hooks being used alternately for attachment of the fitting. The functions of these various hooks will be explained later.

Figure 4:
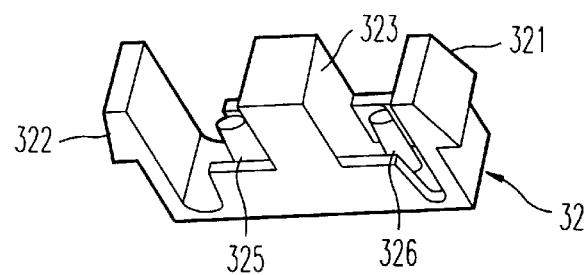
FIG. 4 is an axial sectional view through the lock.
Figure 4:
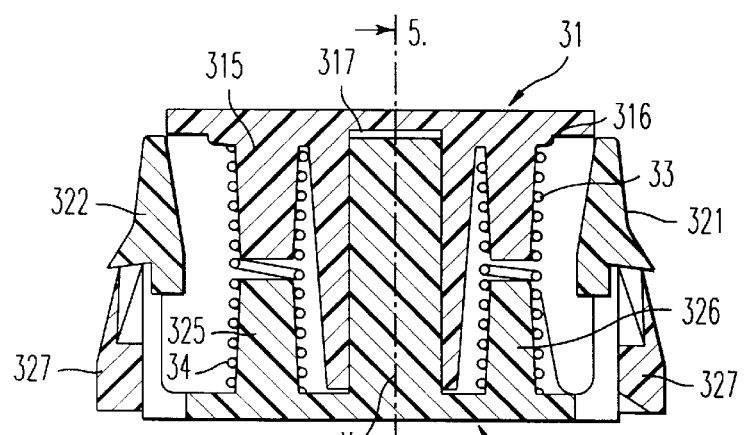

In the central part of piston 32, there is a guide tenon 323 that fits into and slides along the corresponding housing 317, and two elastic strips on the sides that terminate by operating pushers 321 and 322 that attach the piston in the rest position and cause locking. In the rest position shown in FIG. 4, the pushers 321 and 322 are flush with the slots 311 and 312 and latch onto the edges of these slots. Piston 32 can slide inside shell 31 and move outside the shell under the effect of the springs as soon as the pushers 321 and 322 have been squeezed between the fingers to make them release the said piston. The pushers can be pushed in and released from the edges of the slots due to the elasticity of the elastic strips on which the pushers are fitted.

Movement of piston 32 outwards from base 31 is limited by pushers 321 and 322 which are stopped by projections 327 formed in the shell.

Two projections 315 and 316 are formed inside the shell, to center the springs. Similarly, two projections 325 and 326 are formed on piston 32, to center the springs.

The flush mounting type fitting 1 is provided with slots 11 on each side to attach the locks. Two hooks 313 or 314 are engaged into two slots 11 to attach a lock 3 on one side of the flush mounting type fitting.

Figure 5:
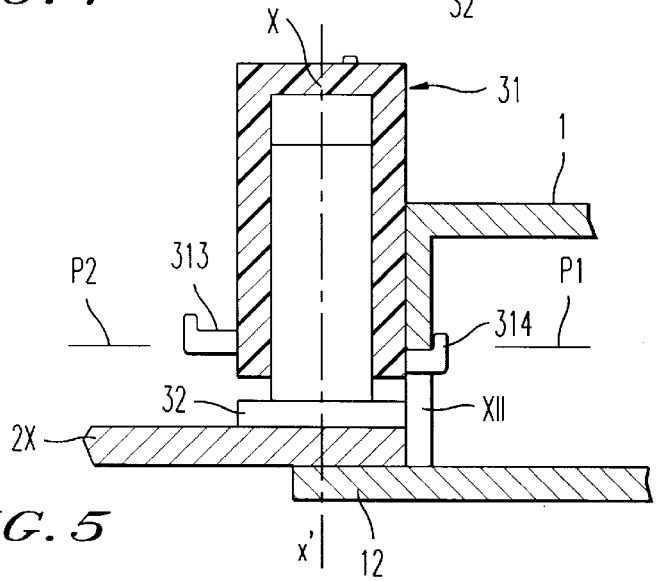
FIG. 5 is a section along IV–IV in FIG. 4 showing the lock in the locking position.

With reference to FIG. 5, note that the first hooks 313 and the second hooks 314 are at different heights along the X—X' axis along which the piston slides.

We will now describe operation.

The fitting 1 is engaged without its various locks in an opening in the panel 2 such that the edge 12 of the fitting stops on the front face of the said panel.

After fitting 1 has been flush mounted in panel 2, the locks 3 are put into place by engaging hooks 313 or 314 in slots 11. Note that in the position shown in FIG. 5, lock 3 is assembled to fitting 1 by hooks 314 and that it cannot tilt due to the fact that it is in firm contact with this flush mounting type fitting.

At this state of the assembly, locks 3 are in the rest position, and pistons 32 are retracted in their respective shells.

Figure 2:
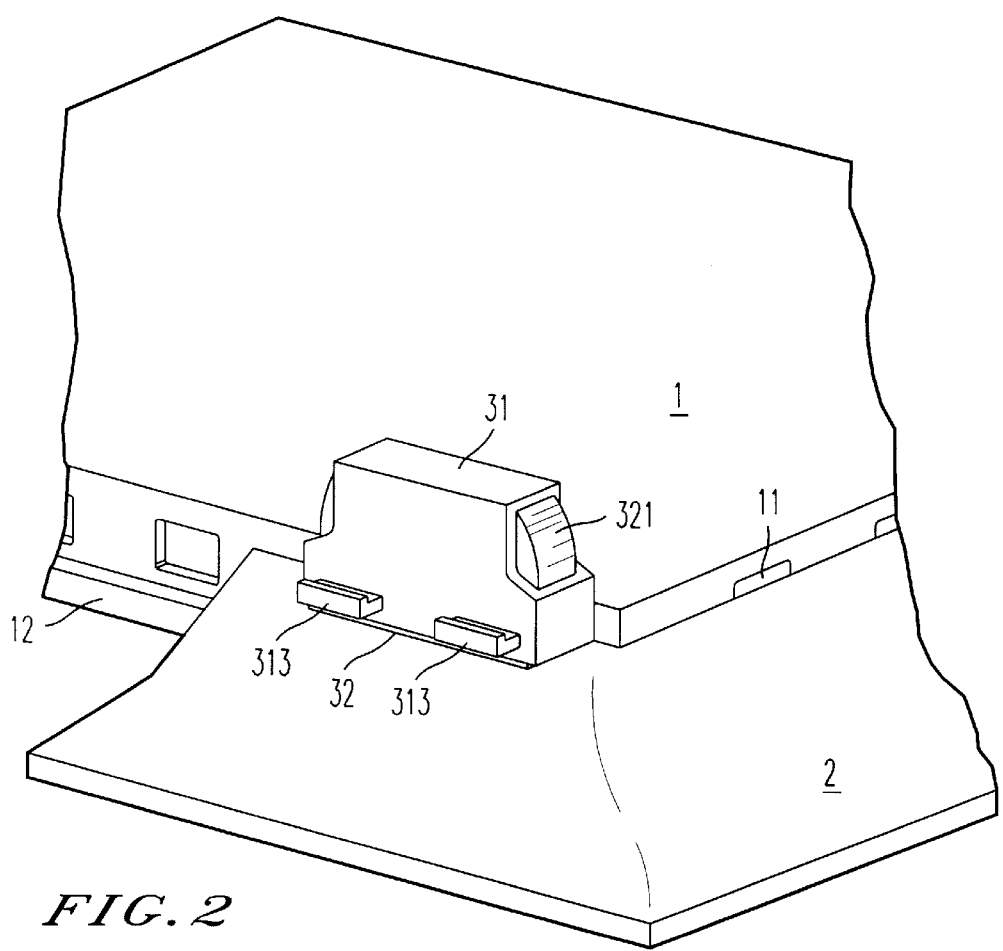
FIG. 2 is a perspective rear view showing the fitting in the flush mounted position and one of the attachment locks.
Figure 3:
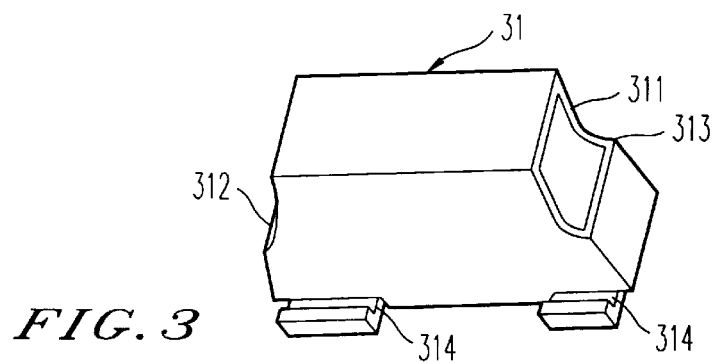
FIG. 3 is an exploded perspective view of an attachment lock.

By squeezing pushers 321 and 322 between two fingers, the flexible strips on which these pushers are fitted are bent and piston 32 is released. The piston can move forwards out of the shell under the action of springs 33 and 34. The front of this pusher comes into contact with the back of panel 2. Finally, it occupies the locked position shown in FIG. 2 and FIG. 5.

In order to remove the locks 3 and release fitting 1, all that is necessary is to retract pistons 32 into their shells 31 until pushers 321 and 322 fit into slots 312 and 313.

Obviously it would be possible to imagine variants and improvements to details and even to consider the use of equivalent means, without going outside the scope of the invention.

What is claimed is:

1. Attachment device for a fitting designed to be flush mounted in a panel opening using a lock, comprising a base fittable into the fitting, and a sliding piston that comes into contact with the panel under the action of compression springs, wherein the piston comprises click fit pushers that fit into slots on the base, so that the piston fastens onto the base in the rest position, and releases the piston when the lock is released, wherein the base comprises at least one first hook on one side, and at least one second hook on a side opposite the one side, said first hook and said second hook being located at different heights relative to an axis along which the piston slides.

2. Attachment device for a fitting designed to be flush mounted in a panel opening using a lock comprising a base fittable into the fitting, a sliding piston that comes into contact with the panel under the action of compression springs wherein the piston comprises elastic strips that terminate in click fit pushers that fit into slots on the base, so that the piston fastens onto the base in the rest position, and releases the piston when the lock is released, wherein a central part of the piston is fitted with a tenon that fits into and slides along a corresponding guiding housing of the base.

3. Attachment device for a fitting designed to be flush mounted in a panel opening using a lock comprising a base fittable into the fitting, a sliding piston that comes into contact with the panel under the action of compression springs, wherein the piston comprises click fit pushers that fit into slots on the base, so that the piston fastens onto the base in the rest position, and releases the piston when the lock is released, wherein the outward movement of the piston with respect to the base is limited by the pushers that reach a limit stop on projections formed in the base.

4. Attachment device for a fitting designed to be flush mounted in a panel opening using a lock comprising a base fittable into the fitting, a sliding piston that comes into contact with the panel under the action of compression springs, wherein the piston comprises click fit pushers that fit into slots on the base, so that the piston fastens onto the base in the rest position and releases the piston when the lock is released, wherein the base is provided with two projections which center the springs and wherein the piston comprises two projections which center said springs.

5. Attachment device according to claim 1, wherein a central part of the pusher is fitted with a tenon that fits into and slides along a corresponding guiding housing of the base.

6. Attachment device according to claim 1, wherein an outward movement of the piston with respect to the base is limited by the pushers that reach a limit stop on projections formed in the base.

7. Attachment device according to claim 2, wherein an outward movement of the piston with respect to the base is limited by the pushers that reach a limit stop on projections formed in the base.

8. Attachment device according to claim 1, wherein the base is provided with two projections which center the springs and that the piston comprises two projections which center the springs.

9. Attachment device according to claim 2, wherein the base is provided with two projections which center the springs and that the piston comprises two projections which center the springs.

10. Attachment device according to claim 3, wherein the base is provided with two projections which center the springs and that the piston comprises two projections which center these springs.

* * * * *